United States Patent
Neeli (10) Patent No.: US 11,595,868 B2
(45) Date of Patent: Feb. 28, 2023

(54) DEPLOYING IDLE TRANSCEIVERS FOR RAPID CONNECTION OF WI-FI CLIENTS

(71) Applicant: Fortinet, Inc., Sunnyvale, CA (US)

(72) Inventor: Srinivasa Subbarao Neeli, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 110 days.

(21) Appl. No.: 17/319,090

(22) Filed: May 13, 2021

(65) Prior Publication Data

US 2022/0369185 A1 Nov. 17, 2022

(51) Int. Cl.
| | |
|---|---|
| *H04L 12/26* | (2006.01) |
| *H04W 36/00* | (2009.01) |
| *H04B 7/0413* | (2017.01) |
| *H04W 88/08* | (2009.01) |
| *H04W 88/04* | (2009.01) |
| *H04W 36/38* | (2009.01) |
| *H04W 72/0453* | (2023.01) |
| *H04B 7/155* | (2006.01) |
| *H04W 16/14* | (2009.01) |
| *H04W 12/06* | (2021.01) |
| *H04W 84/12* | (2009.01) |

(52) U.S. Cl.
CPC .......... *H04W 36/03* (2018.08); *H04B 7/0413* (2013.01); *H04B 7/155* (2013.01); *H04W 36/38* (2013.01); *H04W 72/0453* (2013.01); *H04W 88/04* (2013.01); *H04W 88/08* (2013.01); *H04W 12/06* (2013.01); *H04W 16/14* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,570,983 | B2 * | 10/2013 | Mohebbi | H04B 17/309 |
| | | | | 370/335 |
| 9,288,844 | B1 * | 3/2016 | Akhavan-Saraf | H04W 72/082 |
| 11,109,310 | B1 * | 8/2021 | Crespi | H04W 48/20 |
| 2010/0091670 | A1 * | 4/2010 | Uln | H04W 74/0816 |
| | | | | 370/252 |
| 2010/0302966 | A1 * | 12/2010 | Matsuura | H04W 16/14 |
| | | | | 370/252 |
| 2015/0372977 | A1 * | 12/2015 | Yin | H04L 63/20 |
| | | | | 726/1 |
| 2017/0094556 | A1 * | 3/2017 | HomChaudhuri | H04L 47/11 |
| 2017/0303176 | A1 * | 10/2017 | Kaushik | H04W 36/18 |
| 2018/0310191 | A1 * | 10/2018 | Kloper | H04W 24/08 |
| 2021/0099889 | A1 * | 4/2021 | Johnson | H04W 76/15 |
| 2022/0225152 | A1 * | 7/2022 | Schultz | H04L 5/0041 |
| 2022/0294844 | A1 * | 9/2022 | Jin | H04W 4/80 |

* cited by examiner

*Primary Examiner* — Sithu Ko
(74) *Attorney, Agent, or Firm* — Law Office Of Dorian Cartwright; Dorian Cartwright (57) ABSTRACT

Responsive to receiving a probe request at an idle transceiver over a first channel from a Wi-Fi client and a determination that the Wi-Fi client is not currently associated with the access point for service, a second channel being used for client service is identified. A probe response frame is generated including a CSA (channel switch announcement) indicating the second channel and transmitted to the Wi-Fi client causing authentication over the second channel. The Wi-Fi client is then serviced over the at least one non-idle transceiver over the second channel.

10 Claims, 6 Drawing Sheets

FIG. 6

DEPLOYING IDLE TRANSCEIVERS FOR RAPID CONNECTION OF WI-FI CLIENTS

FIELD OF THE INVENTION

The invention relates generally to computer networking, and more specifically, to deploying idle transceivers of MIMO (multiple input/multiple output) transceiver chains for rapid connection of Wi-Fi clients of data communication networks.

BACKGROUND

WLAN (Wireless Local Area Network) devices are eligible to operate in two unlicensed RF bands, 2.4 GHz RF band and the other is 5 GHz RF band. The 2.4 GHz RF band ranges from 2401 MHz through 2495 MHz, with a total 14 different channels will be available for the WLAN devices to operate (channels 1 through 14).

Similarly, 5 GHz RF Band allows WLAN devices to select and operate over huge list of channels which ranges from 5170 MHz through 5330 MHz and 5490 MHz through 5815 MHz. This entire Frequency range is notated as UNII-I (channels 36 through 48), UNII-2 (channels 52 through 64), UNII-2 Extended (Channels 100 through 144) and UNII-3 (Channels 149 through 161). Altogether, over 5 GHz band, WLAN devices have 24 different channels to operate.

Due to the co-existence with other devices like Microwave ovens and Bluetooth devices, 2.4 GHz band has its own challenges like Interference etc. As the usage of WLAN network is growing day by day in different sectors, more number of 5 GHz capable devices are getting emerged in the market as 5 GHz RF band provides more channels to operate. As the count of 5 GHz capable devices are getting increased drastically, even 5 GHz spectrum is getting exhausted to support these huge count of WLAN operations. To overcome this issue, a new standard called Wi-Fi 6E was designed.

More specifically, the Wi-Fi 6E standard specifies that Frequency range from 5710 MHz through 7125 MHz (called 6 GHz spectrum) will also be an unlicensed spectrum, so that IEEE 802.11 capable devices can utilized this frequency range for RF transmissions. 6 GHz RF band was notated as UNII-5 (with 24 channels), UNII-6 (with 5 channels), UNII-7 (with 17 channels), and UNII-8 (with 13 channels). Hence, with 6 GHz RF support total 59 different channels will be available for WLAN devices to operate.

With the availability of this enormous frequency ranges, WLAN Access points will have different channel options to select and operate. For getting served with the WLAN access points, WLAN client devices have to perform RF scanning by a method of sending probes. During this scanning process, WLAN client devices has to tune their radios to each and every channel which are supported over these different RF bands (i.e., 2.4 GHz, 5 GHz, 6 GHz). Scanning will to be performed on each and every channel by the WLAN client device in the process of identifying the access points and their capabilities.

To avoid interfering with each other access points will choose their channels to operate by considering there neighboring Access Points operating channels. Hence at any particular vicinity two Access points will not choose the same channel to operate. Also, WLAN client device will perform their initial connectivity scanning in ascending order starting from the base channel available on the selected RF band to the highest available channel. At a vicinity of where client was scanning, if access point was operating at the base channel, WLAN client can get associated with the access point much quickly as the count of channels to perform scan will be lesser.

Consider a case where access point was operating at the highest available channel on an RF band (2.4 GHz, 5 GHz, 6 Ghz). Here, when a WLAN client is trying to establish a connection with the access point, it has to scan the entire frequency range by tuning its radio to each and every available channel and then gets associated at the last available frequency in the RF band were access point was operating. For Example, an access point was operating in UNII-8 of 6 GHz RF band at a particular vicinity. To get served with the access point, WLAN client has to complete its scanning starting from UNII-5, UNII-6, UNII-7 which are around 46 different channels and then at last will scan the UNII-8 frequency range and will get associated. Similarly, even for 5 GHz RF band and 2.4 GHz RF band the same process is applicable.

Problematically, WLAN client devices has to perform scanning on the entire RF range for their initial connection establishment with the access points. WLAN clients has to face delay in initial connection establishment with the Access points by scanning the entire enormous frequency range. Client Connection establishment over RF band's like 6 GHz (Wi-Fi 6E) spectrum which has huge frequency range will be delayed as client has to scan the entire frequency range to identify the appropriate access Point for getting served.

Therefore, what is needed is a robust technique for deploying idle transceivers of MIMO transceiver chains for rapid connection of Wi-Fi clients.

SUMMARY

These shortcomings are addressed by the present disclosure of methods, computer program products, and systems for deploying idle transceivers of MIMO transceiver chains for rapid connection of Wi-Fi clients.

In one embodiment, an access point includes a MIMO transceiver chain, wherein an idle transceiver of the MIMO transceiver chain is tuned to a first channel of a baseband and at least one non-idle transceiver of the MIMO transceiver chain is tuned to a second channel of the baseband for service to Wi-Fi client. The idle transceiver is identified and configured for parallel listening for connection requests over the first channel along with the second channel.

In another embodiment, responsive to receiving a probe request from a Wi-Fi client and a determination that the Wi-Fi client is not currently associated with the access point for service, the second channel being used for service is identified. A probe response frame is generated including a CSA (channel switch announcement) indicating the second channel and transmitted to the Wi-Fi client causing authentication over the second channel. The Wi-Fi client is then serviced over the at least one non-idle transceiver over the second channel.

Advantageously, network performance and computer hardware performance are improved with faster connections to Wi-Fi service.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for using artificial intelligence for deploying idle transceivers of MIMO transceiver chains for rapid connection of Wi-Fi clients, based on spectrum availability and spectrum capability. One of ordinary skill in the art will recognize many additional variations made possible by the succinct description of techniques below. For example, although Wi-Fi referred to throughout this document, the same principles can be extended to Bluetooth or hybrid wireless data communication channels.

I. Systems for Rapid Client Connection by Deploying Idle Chain Transceivers (FIG. 1-2)

Figure 1:
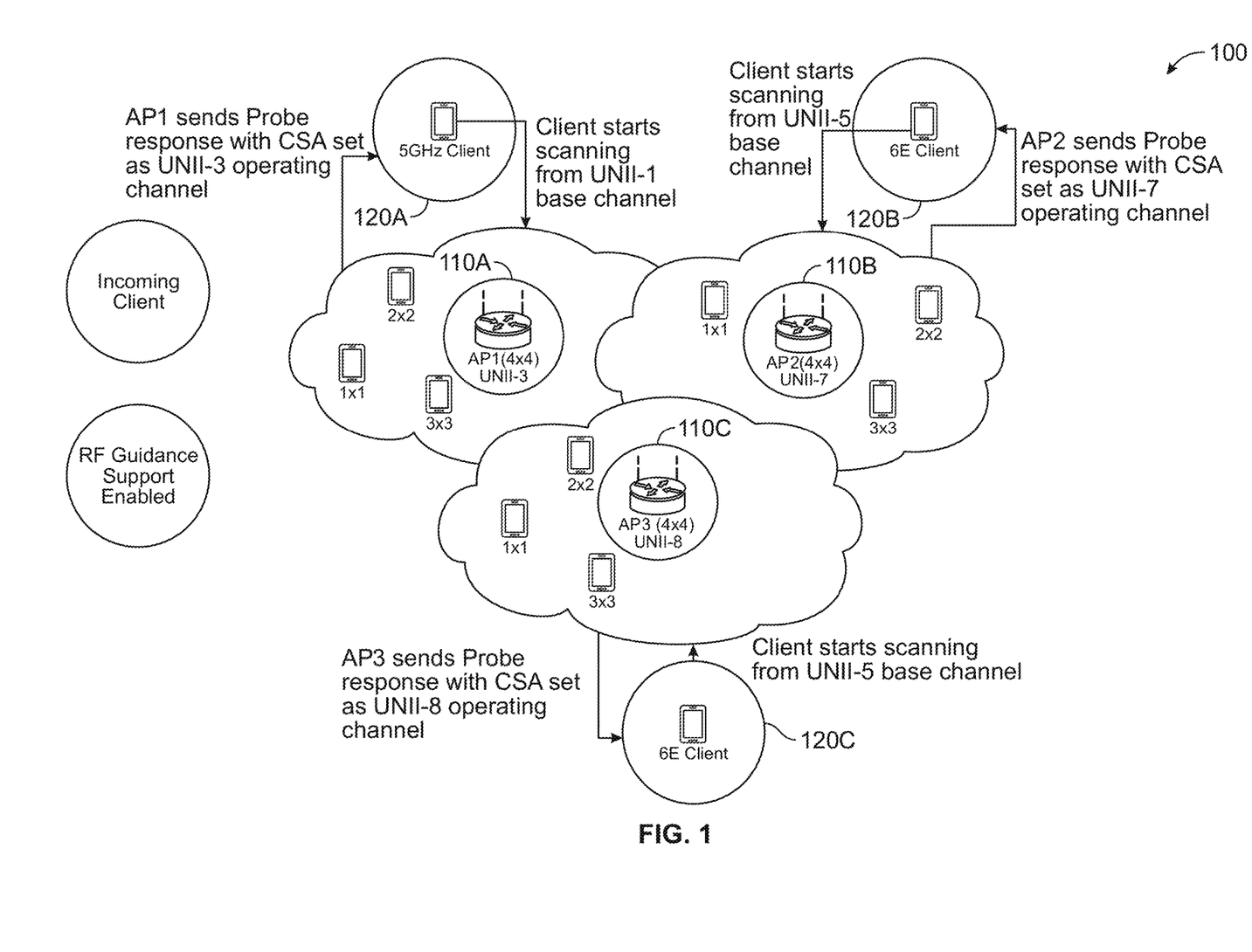
FIG. 1 are high-level block diagrams illustrating a wireless communication system for deploying idle transceivers of MIMO transceiver chains for rapid connection of Wi-Fi clients, over different snapshots in time, according to one embodiment.
Figure 2:
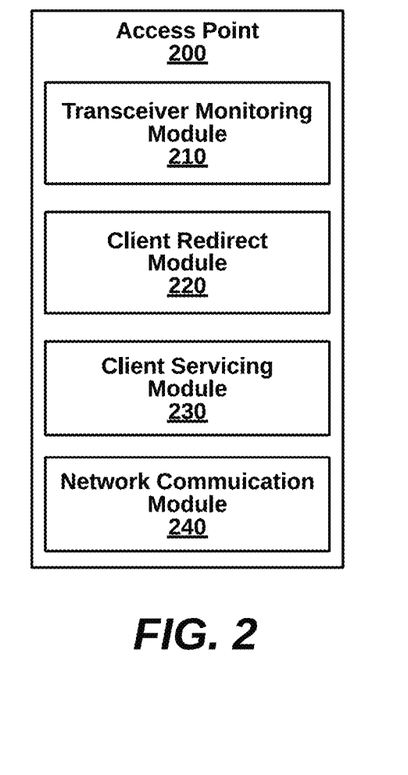
FIG. 2 is a more detailed block diagram illustrating an access point of the system of FIG. 1, according to an embodiment.

FIG. 1 are high-level block diagrams illustrating a system 100 for deploying idle transceivers of MIMO transceiver chains for rapid connection of Wi-Fi clients, according to one embodiment. The system 100 includes access points 110A-C and connecting clients (or stations) 120A-C coupled through a WLAN network. Many other embodiments are possible, for example, with more or fewer access points, more or fewer stations, and additional components, such as firewalls, routers and switches. Hardware and software components can be implemented similar to the example of FIG. 6.

A wide area network 199 links components of the system 100 with a channel for data communication. The access points 110A-C are preferably connected to the wide area network 199 via hardwire. The clients 120A-C, are wirelessly connected to the access points 110A-C to access the wide area network indirectly. The wide area network can be a data communication network such as the Internet, a WAN, a LAN, WLAN, can be a cellular network (e.g., 3G, 4G, 5G or 6G), or a hybrid of different types of networks. Thus, the system 100 components can be located locally on a LAN to communicate with remote and cloud-based devices.

The access points 110A-C rapidly connect to MIMO and non-MIMO clients over a broadband frequency of Wi-Fi, such as 2.4 GHz, or 5.0 GHz, 6.0 GHz (or future larger frequency uses). While the access points 110A-C may be transmitting over one channel, another channel is monitored for redirecting connection attempts to the transmitting channel. For example, connecting client 120A starts scanning from a UNII-1 base channel causing a redirect from access point 110A to a UNII-3 operating channel. Next, the connecting client 120A moves the connection attempt as redirected for authentication. In more detail, a probe request can be sent from the connecting client 120A to the access point 110A requesting access. A probe response can then be returned from the access point 110A to the connecting client 120A with data and parameters to complete the connection (e.g., authentication, uplink limitations, and SSID).

Once connected, the access point 110A can provide can exchange data between the connecting station 120A and resources on the WAN 199 or between other clients on the WLAN. Policies can be implemented that restrict certain traffic exchanges. Additionally, mobile clients can be transparently handed over (e.g., voluntary or forced hand off) from one access point to another access point without disruption to data communications by sharing SSIDs. One embodiment of the system 100 includes one or more Wi-Fi controllers to manage multiple access points and to uniformly manage clients moving among the multiple access points.

In some embodiments, the access points 110A-C comply with IEEE 802.11 protocols for 5.0 GHz and 6.0 GHz transmission. For instance, 160 MHz bandwidth channels can operate under IEEE 802.11, or more specifically IEEE 802.11AX (or Wi-Fi 6), over allowed frequencies. The access points 110A-C can also have combinations of 80 MHz, 40 MHz and 20 MHz bandwidth channels available for stations. In one example, the access points 110A-C are hardware built for beamforming for bi-directional MU-MIMO (multiple-user, multiple input, multiple output) with multiple antennae in, for example, 2×2, 3×3, 4×4 or 8×8 stream variations. Different modulation schemes can be implemented, such as QAM and OFDMA (orthogonal frequency division multiple access). Access points of an implementation downgrade stations from 6 GHz to 5 GHz, or 5 GHz to 2.4 GHz, as necessary to prevent congestion. Additional airtime fairness techniques can be implemented by access points in combination with the presently implemented WLAN uplink device 120 steering techniques. Access points can measure the signal strength and flight time from various stations based on data packets received from those stations. Local network statistics can be collected and sent upstream from system-wide monitoring. The access points 110A-C are described in more detail below with respect to FIG. 2.

The clients 120A-C are preferably enabled for 5 GHz or 6 GHz. Channel bandwidths can be enabled for 160 MHZ, 80 MHz, 40 MHz or 20 MHz. Communications use beamforming with MU-MIMO for parallel data transmissions with high throughput. A probe request to join a Wi-Fi network and receive available SSIDs. Any designated access point within range can respond to a particular stations and other access points can ignore the particular stations (e.g., by MAC address).

Figure 6:
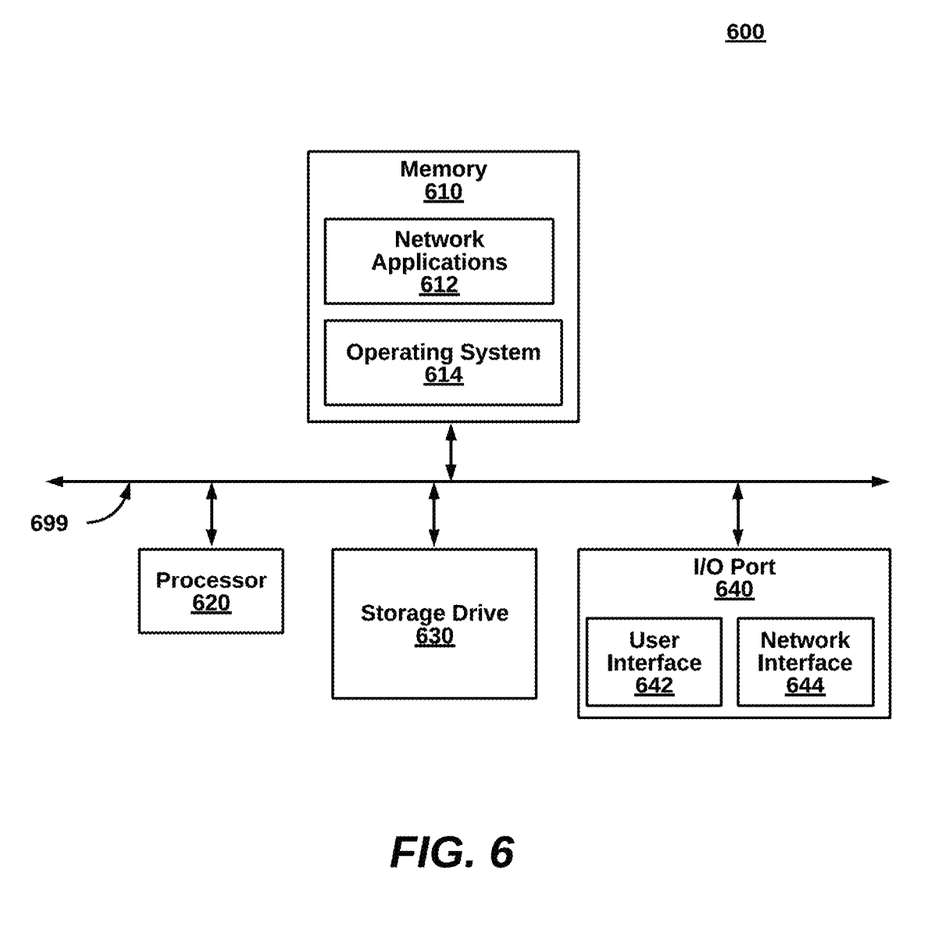
FIG. 6 is a block diagram illustrating an example computing device for the components of FIG. 1, according to one embodiment.

The network components of the system 100 can implemented in any of the computing devices discussed herein, for example, a personal computer, a laptop computer, a tablet computer, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 6).

FIG. 2 is a more detailed block diagram illustrating an access point 200 (representative of access points 110A-C) of the system 100, according to an embodiment. The access point 200 includes a transceiver monitoring module 210, a client redirect module 220, a client servicing module 230, and a network communication module 240. The components can be implemented in hardware, software, or a combination of both.

The transceiver monitoring module 210 can identify an idle transceiver that is not participating in service to connected clients. For instance, consider an access point which is capable of 4×4 RF transceiver chains. If WLAN clients which got associated to this access point are only 1×1 and 2×2 chain capable, access points can have couple of chains idle and can be utilized for other intelligent operations. The idle transceiver is configured for parallel listening of connection requests over a first channel along with standard listening over a second channel at which client servicing occurs. In a preferred embodiment, the idle transceiver listens at a first channel available for a particular baseband. Wi-Fi 6 has 59 channels, and while a non-idle transceiver can be servicing any channel 2 through channel 59, the idle transceiver listens to channel 1 where connection attempts are likely to be first initiated. Other configurations area also possible.

The client redirect module 220, responsive to receiving a probe request from a Wi-Fi client, determines whether the Wi-Fi client is currently associated with the access point for service. If so, then the probe request can be ignored. If not currently associated, redirection is needed. A current channel being used for service is identified. A probe response frame is generated and includes a CSA (channel switch announcement) indicating the operational channel, for transmission to the Wi-Fi client.

The client servicing module 230 can service the Wi-Fi client over the at least one non-idle transceiver over operational channel. Then association process, once redirected, allows quick connections without sequential scanning through each of the other baseband channels not currently being used.

Finally, the network communication module 240 includes a MIMO transceiver chain 242 as part of providing communication protocols, software and hardware for network communication. An idle transceiver of the MIMO transceiver chain is tuned to a first channel of a baseband and at least one non-idle transceiver of the MIMO transceiver chain is tuned to a second channel of the baseband for service to Wi-Fi clients.

Figure 3:
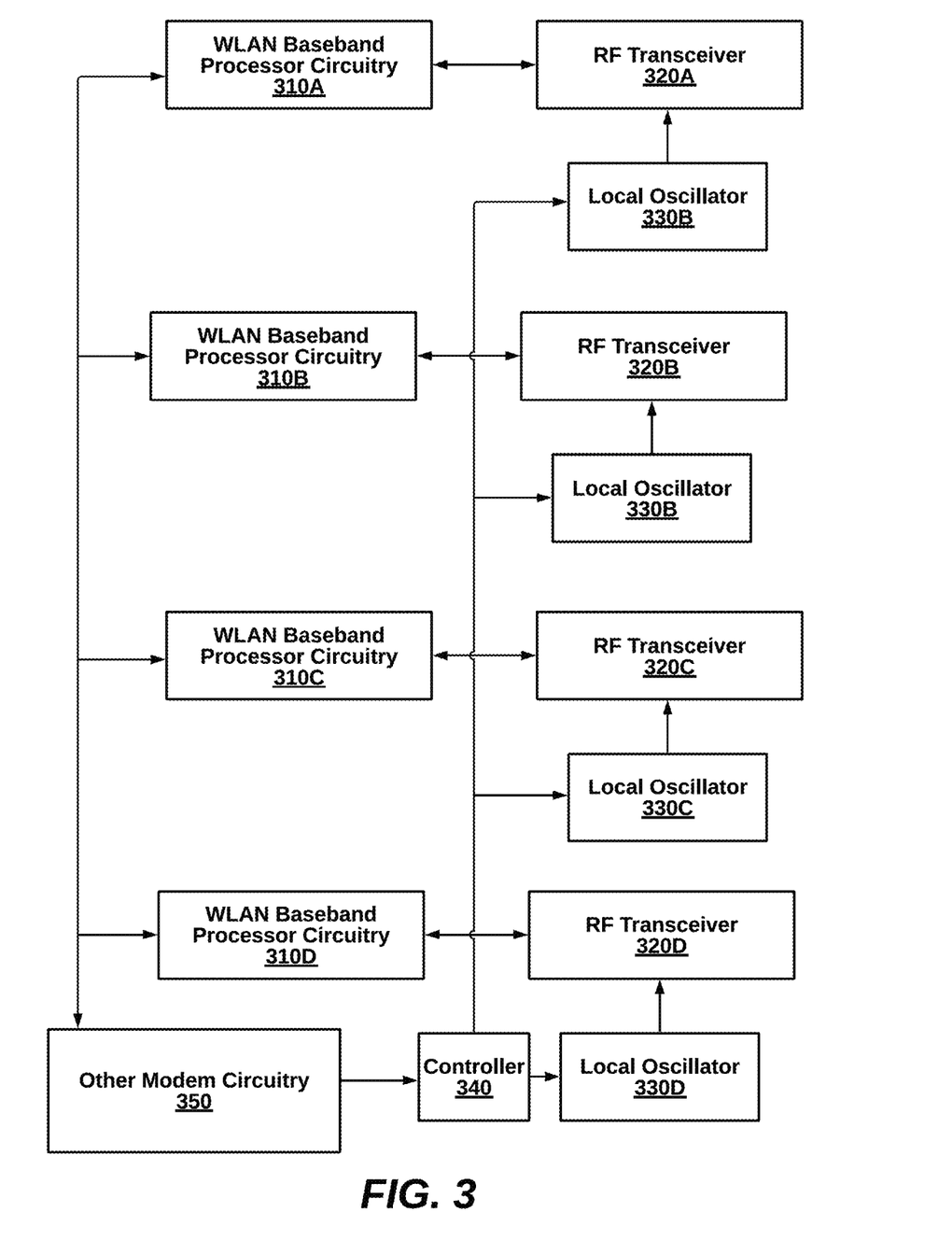
FIG. 3 is a more detailed block diagram illustrating a MIMO transceiver chain of the access point of FIG. 2, according to an embodiment.

An example MIMO transceiver chain 242 is shown in FIG. 3. Each of the RF transceivers 320A-D receives an LO signal from a corresponding local oscillator 330A-D to transmit data from a corresponding WLAN baseband processor circuitry 310A-D. The local oscillators 330A-C can be implemented with a PLL (phase locked loop). A controller 340 can manage and coordinate the local oscillators 330A-D. Additional modem operations, such as memory and antennae can be implemented in other modem circuitry 350.

II. Methods for Rapid Client Connection by Deploying Idle Chain Transceivers (FIGS. 4-5)

Figure 4:
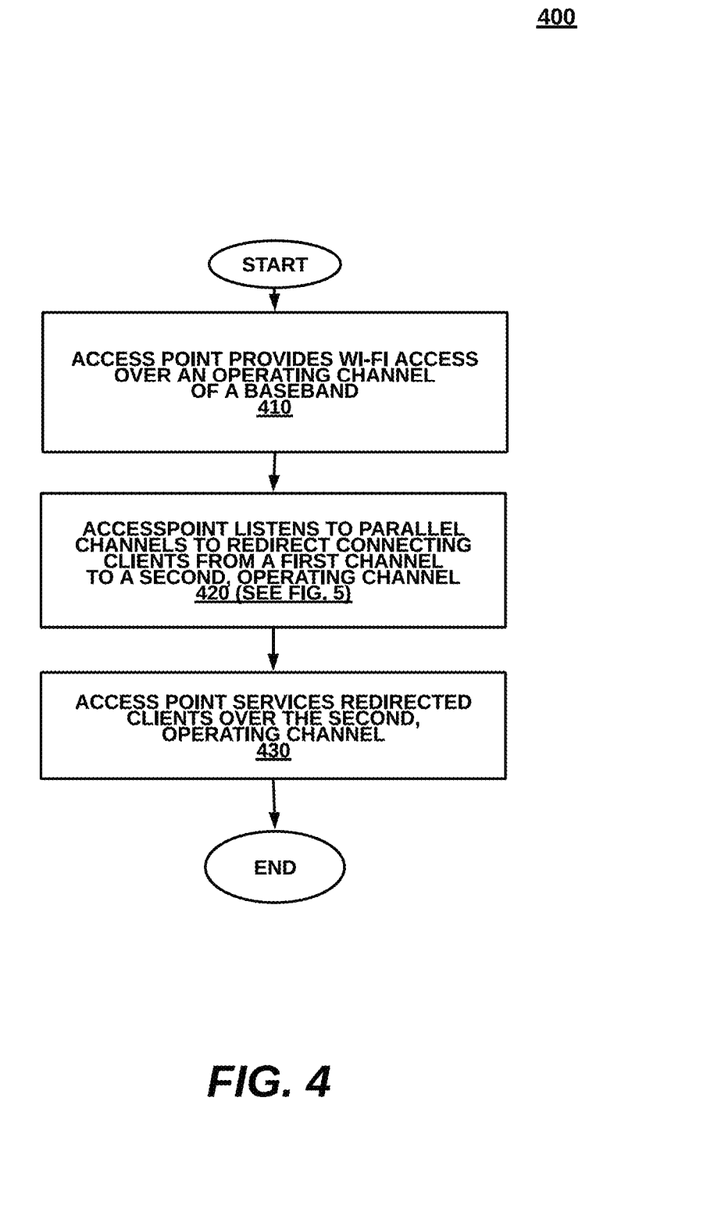
FIG. 4 is a high-level flow diagram illustrating a method for fast client connections, according to one embodiment.

FIG. 4 is a high-level flow diagram illustrating a method for using artificial intelligence to drive stations with 6 GHz uplink capability across access points of a wireless network, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, an access point provides Wi-Fi access over an operating channel of a baseband. At step 420, the access point listens to channels in parallel to redirect connecting clients from a first channel to a second, operating channel, as described more fully below. At step 430, the access point services the redirected connecting clients over the operating channel.

Figure 5:
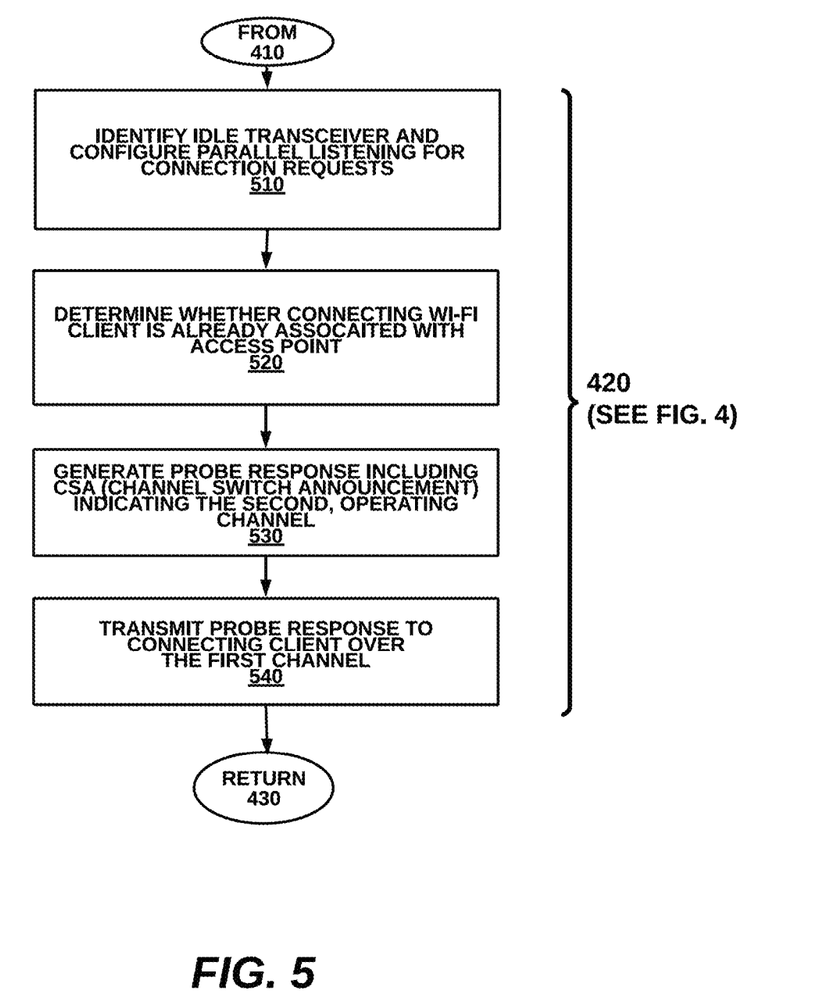
FIG. 5 is a more detailed flow diagram illustrating a step of deploying idle transceivers of MIMO transceiver chains for rapid connection of Wi-Fi clients of the method of FIG. 4, according to an embodiment.

Referring now to FIG. 5, one embodiment of redirection step 420 is detailed. At step 510, a non-idle transceiver is identified and configured for parallel listening for connection requests over the first channel along with the second channel.

At step 520, responsive to receiving a probe request from a Wi-Fi client, it is determined whether the Wi-Fi client is currently associated with the access point for service. If so, the probe request is ignored at step 525. If not currently associated, the second channel being used for service is identified and a probe response frame including a CSA (channel switch announcement) indicating the second channel is generated and transmitted to the Wi-Fi client, at step 530. The probe response is transmitted over the original, first channel used for listening.

III. Generic Computing Device for Fast Connections (FIG. 6)

FIG. 6 is a block diagram illustrating an example computing device 600 for use in the system 100 of FIG. 1, according to one embodiment. The computing device 600 is implementable for each of the components of the system 100 including access points 110A-C and clients 120A-C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An access point in a data communication network for deploying idle transceivers of MIMO (multiple input/multiple output) transceiver chains for rapid connection of Wi-Fi clients, the access point comprising:
    a processor;
    a network interface, comprising a MIMO transceiver chain and communicatively coupled to the data communication network and to a Wi-Fi network, wherein an idle transceiver of the MIMO transceiver chain is tuned to a first channel of a baseband and at least one non-idle transceiver of the MIMO transceiver chain is tuned to a second channel of the baseband for service to the Wi-Fi clients; and
    a memory, storing source code comprising:
    a first module to identify the idle transceiver and to configure for parallel listening for connection requests over the first channel along with the second channel;
    a second module to, responsive to receiving a probe request from a Wi-Fi client, determine that the Wi-Fi client is not currently associated with the access point for service, identify the second channel being used for service, and generate a probe response frame including a CSA (channel switch announcement) indicating the second channel and transmitted to the Wi-Fi client causing authentication over the second channel; and
    a third module to service the Wi-Fi client over the at least one non-idle transceiver over the second channel.

2. The access point of claim 1, wherein the MIMO transceiver chain comprises either a 2×2, a 3×3 or a 4×4 MIMO transceiver chain.

3. The access point of claim 1, wherein the MIMO transceiver chain comprises a 4×4 MIMO transceiver chain and a highest capability for a plurality of connected Wi-Fi clients is one of either 3×3 or 2×2 MIMO transceiver chain.

4. The access point of claim 1, wherein the first channel comprises a UNII-5 channel and the second channel comprises at one of either a UNII-6, a UNII-7 or a UNII-8 channel.

5. The access point of claim 1, wherein the first channel comprises a UNII-1 channel and the second channel comprises at UNII-3 channel.

6. The access point of claim 1, wherein the Wi-Fi client is configured to scan channels in sequential order.

7. The access point of claim 1, wherein the baseband comprises either one of 2.4 GHz, 5.0 GHz and 6.0 GHz.

8. The access point of claim 1, wherein the second module ignores the probe request responsive to the Wi-Fi client already being currently associated with the access point for service.

9. A non-transitory computer-readable media storing source code that, when executed by a processor, performs a computer-implemented method, in an access point coupled to a plurality of access points on a data communication network, for deploying idle transceivers of MIMO (multiple input/multiple output) transceiver chains for rapid connection of Wi-Fi clients, the computer-implemented method comprising the steps of:
    tuning an idle transceiver of a MIMO transceiver chain to a first channel of a baseband and at least one non-idle transceiver of the MIMO transceiver chain is tuned to a second channel of the baseband for service to the Wi-Fi clients;

identifying the idle transceiver and configuring for parallel listening for connection requests over the first channel along with the second channel;

responsive to receiving a probe request from a Wi-Fi client, determining that the Wi-Fi client is not currently associated with the access point for service, identifying the second channel being used for service, and generate a probe response frame including a CSA (channel switch announcement) indicating the second channel and transmitted to the Wi-Fi client causing authentication over the second channel; and servicing the Wi-Fi client over the at least one non-idle transceiver over the second channel.

10. A computer-implemented method an access point coupled to a plurality of access points on a data communication network, for deploying idle transceivers of MIMO (multiple input/multiple output) transceiver chains for rapid connection of Wi-Fi clients, the computer-implemented method comprising:

tuning an idle transceiver of a MIMO transceiver chain to a first channel of a baseband and at least one non-idle transceiver of the MIMO transceiver chain is tuned to a second channel of the baseband for service to the Wi-Fi clients;

identifying the idle transceiver and configuring for parallel listening for connection requests over the first channel along with the second channel;

responsive to receiving a probe request from a Wi-Fi client, determining that the Wi-Fi client is not currently associated with the access point for service, identifying the second channel being used for service, and generate a probe response frame including a CSA (channel switch announcement) indicating the second channel and transmitted to the Wi-Fi client causing authentication over the second channel; and servicing the Wi-Fi client over the at least one non-idle transceiver over the second channel.

* * * * *